United States Patent [19]
Pierce et al.

[11] Patent Number: 5,720,489
[45] Date of Patent: Feb. 24, 1998

[54] MOVABLE SUBFRAME FOR TRACTOR-TRAILERS

[75] Inventors: Phillipi Randsome Pierce; Scott Allen Dilling; John Edward Ramsey, all of Canton, Ohio

[73] Assignee: The Boler Company, Itasca, Ill.

[21] Appl. No.: 443,210

[22] Filed: May 17, 1995

[51] Int. Cl.$^6$ .................. B62D 33/08; B62D 21/00
[52] U.S. Cl. ............. 280/149.2; 280/788; 280/800
[58] Field of Search .................. 280/149.2, 781, 280/800, 793, 794, 788; 296/204

[56] References Cited

U.S. PATENT DOCUMENTS

| | | | |
|---|---|---|---|
| 788,108 | 4/1905 | Jones | 280/781 |
| 1,314,498 | 9/1919 | Bower | 280/149.2 |
| 1,349,589 | 8/1920 | Sweet | 280/800 |
| 2,119,193 | 5/1938 | Avery | 280/800 |
| 3,664,679 | 5/1972 | Hille | 296/204 |
| 5,114,183 | 5/1992 | Haluda et al. | 280/781 |
| 5,378,006 | 1/1995 | Stuart et al. | 280/149.2 |

FOREIGN PATENT DOCUMENTS

| | | | |
|---|---|---|---|
| 2-151578 | 6/1990 | Japan | 280/800 |
| 612287 | 11/1948 | United Kingdom | 280/800 |

*Primary Examiner*—Paul N. Dickson

[57] ABSTRACT

A movable subframe or slider for a tractor-trailer includes a pair of elongated spaced-apart parallel main members and at least one generally K-shaped cross member structure which extends between and is attached to the main members. Specifically, the K-shaped cross member structure includes a base member which extends perpendicularly between and is attached to the main members, and further includes a pair of inclined members, each of which extends angularly between and is attached to a respective one of the main members and the base member. Each of the main members is adapted to be slidably mounted on a respective one of a pair of depending parallel rails of a trailer, and a retractable pin mechanism enables selective positioning of the slider along the rails for variable load distribution of cargo contained in the trailer. A hanger depends from each of the main members adjacent to the ends of the base member for supporting an axle/suspension system. Components of the axle/suspension system also are mounted directly on and adjacent to the inclined members. The K-shaped cross member structure enables the slider to be relatively lightweight yet have improved capability for withstanding the combined vertical and bending lateral and longitudinal loads that the slider is subjected to during operation of the tractor-trailer while being relatively inexpensive to manufacture.

5 Claims, 8 Drawing Sheets

MOVABLE SUBFRAME FOR TRACTOR-TRAILERS

BACKGROUND OF THE INVENTION

1. Technical Field

The invention relates to tractor-trailer subframes and in particular to movable subframes for tractor-trailers. More particularly, the invention is directed to a movable subframe for tractor-trailers which includes one or more generally K-shaped structures which replace parallel cross members of conventional subframes, for more securely supporting one or more axle/suspension systems suspended therefrom while reducing the overall weight of the subframe.

2. Background Art

Movable subframes, typically referred to as sliders, have been utilized on tractor-trailers or semi-trailers for many years. One or more axle/suspension systems usually are suspended from a single slider structure. The slider is in turn mounted on the underside of the trailer body, and is movable longitudinally therealong to provide a means of variable load distribution. More specifically, the amount of cargo that a trailer may carry is governed by local, state and/or national road and bridge laws, and is dependent on proper load distribution. The basic principle behind most road and bridge laws is to limit the maximum load that a vehicle may carry, as well as to limit the maximum load that can be supported by individual axles. A trailer having a slider gains an advantage with respect to laws governing maximum axle loads. More particularly, proper placement of the slider varies individual axle loads or redistributes the trailer load so that it is within legal limits. Once properly positioned, the slider is locked in place on the underside of the trailer by a retractable pin mechanism.

Conventional or prior art slider designs were developed before the advent of air suspension systems for trailers. At that time, spring suspension systems were the suspension of choice for trailers and sliders. However, the spring suspension system was unable to provide any load distribution for varying load situations, thus creating the need for a slider which alone provided variable load distribution. The development of the slider resulted in good variable load distribution for trailers, which enabled trailers having sliders to carry heavier loads.

Moreover, the subsequent development of air suspension systems provided load equalization among multiple axles for tractor-trailers, with or without the utilization of sliders, as well as improved ride quality for individual axles. Of course, the combination of a movable slider and an air suspension system provided maximum versatility with respect to variable load distribution and load equalization in a trailer. Unfortunately, prior art sliders equipped with air suspensions add unwanted weight to the trailer, primarily because those sliders were originally built to support spring suspensions and adapting them to incorporate air suspensions required additional bracing and support.

Also, vehicles containing more than one non-steerable axle, including tractor-trailers, are subject to lateral or side loads. Lateral loads can act through the slider in opposite directions, and the effect of such bending loads on the slider can be significant. Moreover, a slider is subjected to strong vertical and longitudinal loads. Thus, the loads produced on the slider must be controlled by the slider design. Prior art slider designs control vertical loads by utilizing rigid, and therefore heavy, main members and cross members. However, such a rigid structure fails to minimize the effect of lateral and longitudinal loads on the slider structure.

The present invention solves the problems of excessive weight and potentially damaging lateral, longitudinal and vertical loading on tractor-trailer sliders, by replacing the parallel cross members of the slider with one or more K-shaped structures.

SUMMARY OF THE INVENTION

Objectives of the present invention include providing a slider for tractor-trailers having significantly reduced weight from that found in prior art sliders, yet having improved capability for withstanding combined vertical and bending lateral and longitudinal loads.

Another objective of the present invention is to provide such a slider for tractor-trailers which is less expensive to manufacture than prior art sliders.

These objectives and advantages are obtained by the slider for tractor-trailers of the present invention, the general nature of which may be stated as including a subframe structure for a vehicle trailer, the subframe structure being movably mounted on spaced-apart, parallel elongated rails mounted on the bottom of the trailer, the subframe structure including a pair of spaced-apart, parallel elongated main members, the main members each including means for movably engaging a respective one of the trailer rails, at least one cross member structure which extends between and is attached to the main members, the cross member structure including a base member which extends perpendicularly between and is attached to the main members, a pair of inclined members, each of which extends angularly between and is attached to a respective one of the main members and the base member, and means for mounting an axle/suspension system on the subframe structure, and means for selectively positioning the subframe structure relative to the trailer for variable load distribution of cargo contained in the trailer.

BRIEF DESCRIPTION OF THE DRAWINGS

The preferred embodiment of the invention, illustrative of the best mode in which applicants have contemplated applying the principles, is set forth in the following description and is shown in the drawings and is particularly and distinctly pointed out and set forth in the appended claims.

Similar numerals refer to similar parts throughout the drawings.

DESCRIPTION OF THE PREFERRED EMBODIMENT

Figure 1:
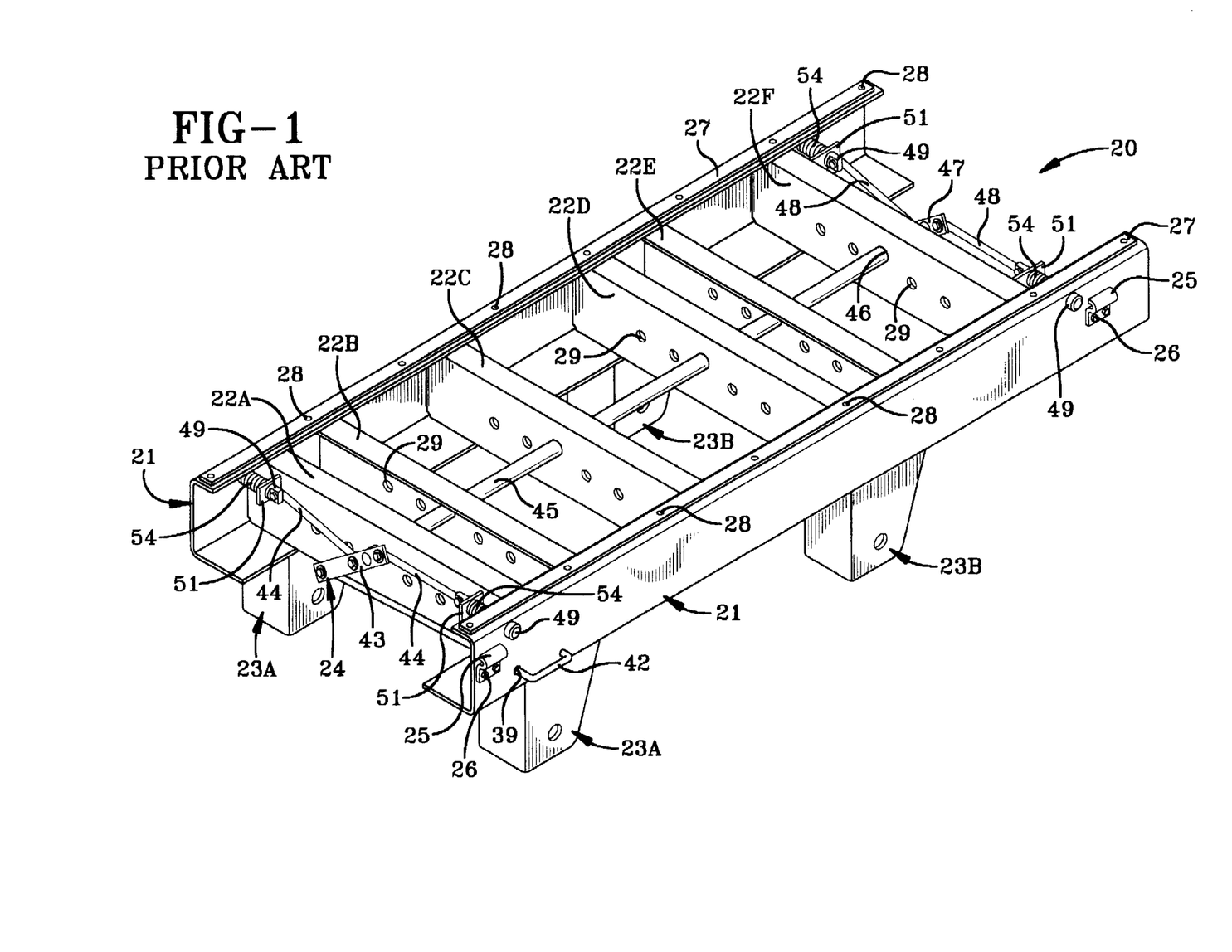
FIG. 1 is a perspective view of a prior art slider for a tractor-trailer, showing the retractable pin mechanism used to selectively locate the slider along the underside of a trailer, and further showing depending hangers for suspending axle/suspension systems.

A prior art slider for a tractor-trailer is indicated generally at 20 and is shown in FIG. 1. Slider 20 includes a pair of main members 21, a plurality of cross members 22A through F, front and rear pairs of hangers 23A and 23B, respectively, for suspending axle/suspension systems, and a retractable pin mechanism 24.

Specifically, each main member 21 is an elongated, generally C-shaped beam made of a metal such as steel or other suitable material. The open portion of each main member 21 is opposed to the open portion of the other main member and faces inboard relative to slider 20. Main members 21 are connected to each other in spaced apart parallel relationship by cross members 22A–F, which extend between and are perpendicular to main members 21. Each end of each cross member 22 nests in the open portion of a respective one of main members 21, and is secured therein by any suitable means such as welding or mechanical fastening. Each cross member 22 is a generally C-shaped beam made of a metal such as steel or other suitable material, and has a plurality of openings 29 formed in its vertically extending surface. Openings 29 are aligned with corresponding openings formed in the other cross members 22 to provide for passage of air and/or fluid conduits, electrical lines, and the like used in the operation of the tractor-trailer (not shown). Each front hanger 23A is attached by welding or other suitable means, to the lowermost surface of a respective one of main members 21 at a location directly beneath cross members 22A, B. Each rear hanger 23B is similarly attached at a location directly beneath cross members 22D, E.

Each main member 21 has a pair of rail guides 25 mounted on its outboard surface by bolts 26. Each rail guide 25 is mounted adjacent to a respective one of the ends of main member 21. A low friction strip 27 is attached to the uppermost surface of each main member 21 by recessed fasteners 28, and extends generally the entire length of main member 21. Strip 27 is formed of any suitable low friction material, such as ultra-high molecular weight polyethylene.

Figure 2:
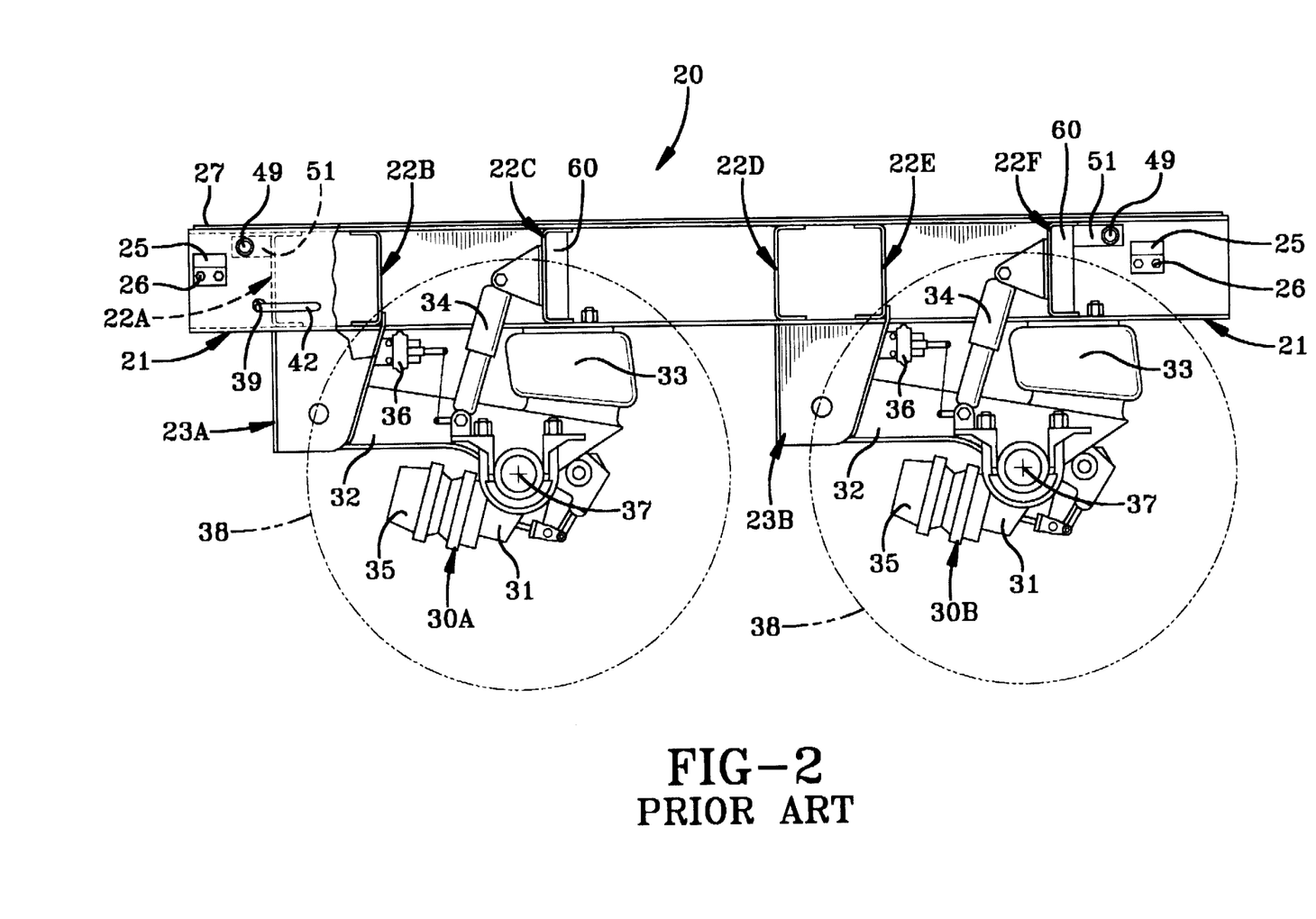
FIG. 2 is a fragmentary elevational view of the prior art slider shown in FIG. 1, but showing the axle/suspension systems, with the location of wheels and hidden parts represented by broken lines.
Figure 3:
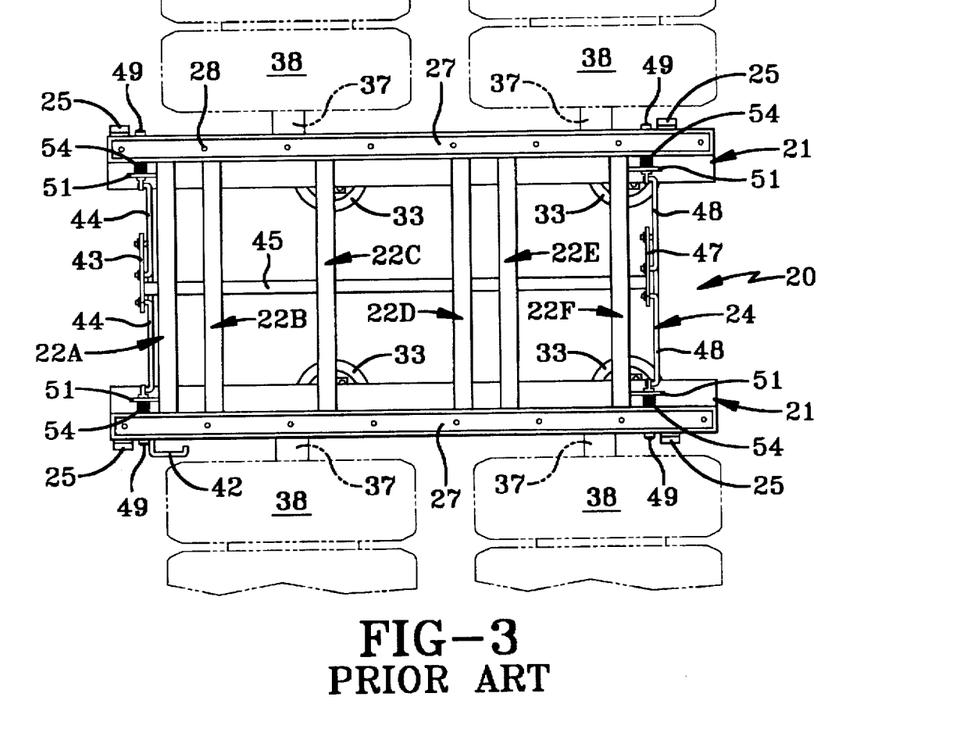
FIG. 3 is a reduced fragmentary top plan view of the prior art slider shown in FIG. 2.

As mentioned hereinabove, and as best shown in FIGS. 2 and 3, slider 20 of the prior art supports front and rear axle/suspension systems 30A and 30B, respectively. Inasmuch as each axle/suspension system 30A, B is suspended from slider 20, but does not form an integral part thereof, only the major components of system 30 will be cited for aiding in the description of the environment in which the prior art slider operates. Each axle/suspension system 30A, B includes generally identical suspension assemblies 31 suspended from each hanger of the pair of hangers 23A, B, respectively. Each suspension assembly 31 includes a suspension beam 32 which is pivotally mounted on hanger 23 in a usual manner. An air spring 33 is suitably mounted on and extends between the upper surface of the rearwardmost end of suspension beam 32 and main member 21 at a location directly beneath a certain one of the cross members 22C, F. A shock absorber 34 extends between and is mounted on suspension beam 32 and the certain cross member 22. One or more reinforcement struts 60 are strategically attached within each cross member 22C, F to strengthen the cross member for supporting suspension assemblies 31. Other components of suspension assembly 31, mentioned herein only for the sake of relative completeness, include an air brake 35 and a height control valve 36. An axle 37 extends between and is captured in the pair of suspension beams 32 of each axle/suspension system 30A, B. Wheels 38 are mounted on each end of axle 37.

Figure 5:
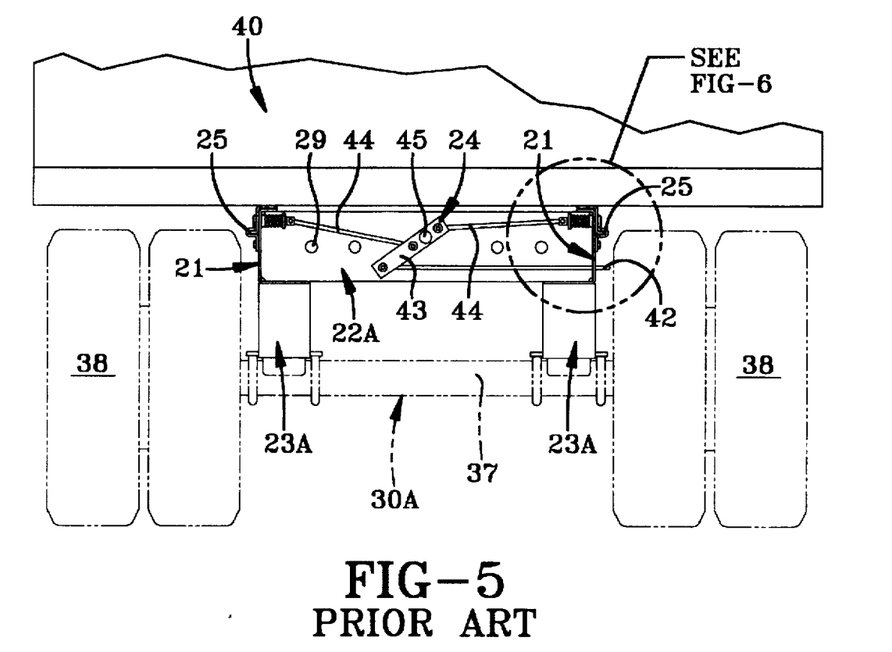
FIG. 5 is an enlarged fragmentary front end view of the slider shown in FIG. 4.
Figure 6:
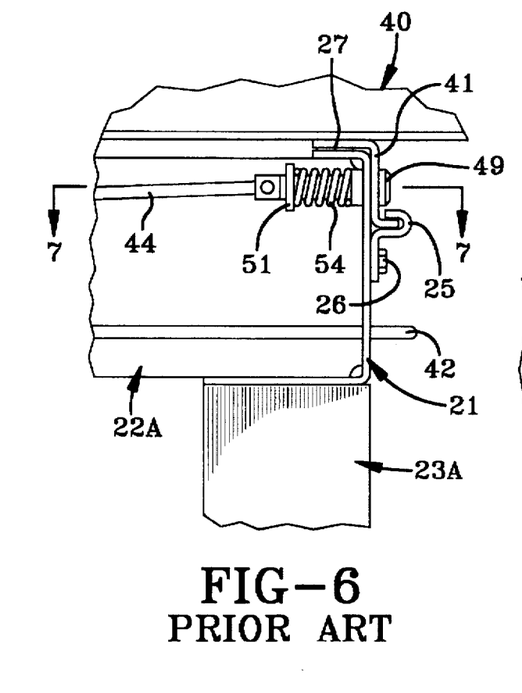
FIG. 6 is an enlarged fragmentary view taken from the area circled by broken lines in FIG. 5, showing a portion of the retractable pin mechanism used to selectively locate the slider on the underside of a trailer body.
Figure 7:
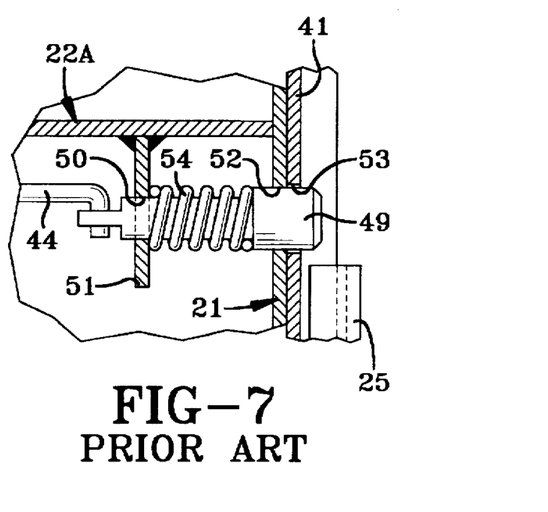
FIG. 7 is a sectional view taken along line 7—7 of FIG. 6.

Slider 20 is movably mounted on trailer body 40 (FIGS. 4–6) by slidable engagement of rail guides 25 with spaced apart, parallel and generally Z-shaped rails 41, which are mounted on and depend from the underside of the trailer body. Each low friction strip 27 abuts the bottom surface of the uppermost portion of a respective one of rails 41 to provide a smooth, generally friction-free contact surface for slidable movement of slider 20 on trailer body 40.

Slider 20 can be selectively positioned relative to trailer body 40 for optimum load distribution by retractable pin mechanism 24. As best shown in FIGS. 1, 3 and 5–7, pin mechanism 24 includes a generally L-shaped handle 42, which passes through an opening 39 formed in a selected one of main members 21. It can be seen that the bent end portion of handle 42 which extends outwardly from the outboard side of main member 21 is accessible for easy grasping by an operator of the tractor-trailer. The inboard end of handle 42 is pivotally attached to a lever 43, which in turn is pivotally attached to a pair of arms 44 which extend in opposite outboard directions from lever 43. Lever 43 further is attached to an elongated pivot rod 45 which passes rearwardly through a plurality of aligned openings 46 formed in cross members 22. The end of pivot rod 45 remote from lever 43 is similarly attached to a remote lever 47, which in turn is pivotally attached to a pair of arms 48 which extend in opposite outboard directions from lever 47. The outboard end of each of arms 44, 48 is bent and is pivotally attached to the inboard end of a pin 49.

Figure 4:
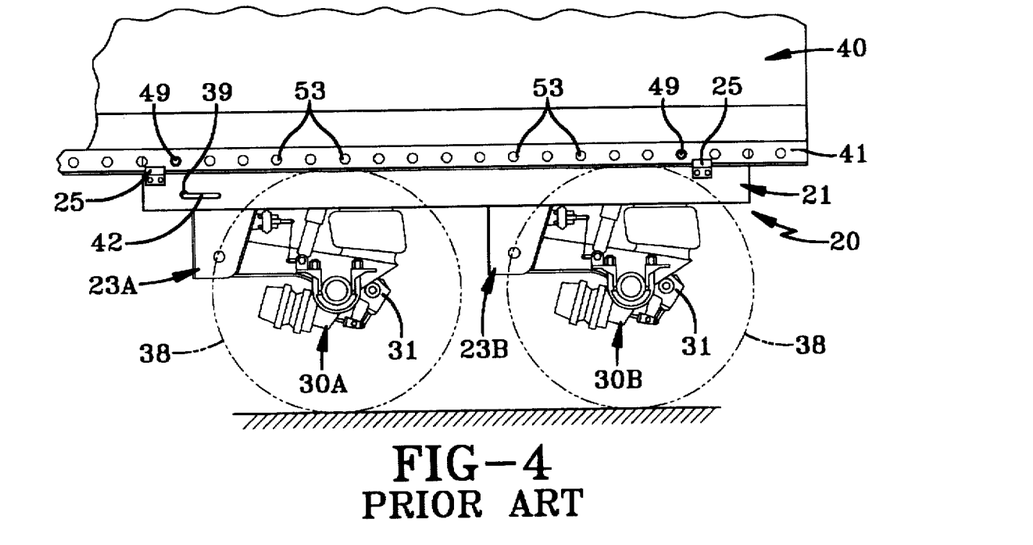
FIG. 4 is a fragmentary elevational view, showing the prior art slider of FIG. 3 movably mounted on the underside of a trailer body.

The inboard end of each pin 49 is slidably mounted (FIGS. 1 and 6–7) in an opening 50 formed in a bracket 51 which is attached by suitable means such as welding to a respective one of cross members 22A and 22F. The enlarged outboard end of each pin 49 passes through an opening 52 formed in a respective one of main members 21. When it is desired to lock slider 20 in a selected position relative to trailer body 40, the main member openings 52 are aligned with selected ones of a plurality of correspondingly sized openings 53 formed in rails 41 of the trailer body (FIG. 4). Each pin 49 automatically extends through the selected aligned openings 52, 53 since the pin is biased in an outboard direction by a coil spring 54 captured between bracket 51 and the enlarged outboard end of pin 49. When it is again desired by the operator of the tractor-trailer to move slider 20 beneath trailer body 40, the parking brake of the trailer is engaged, handle 42 is pulled in an outboard direction to retract pins 49 out of rail openings 53, and slider 20 is moved longitudinally along rails 41 until main member openings 52 align with selected rail openings 53 and pins 49 engage therewith as described hereinabove for maximizing load distribution.

Figure 8:
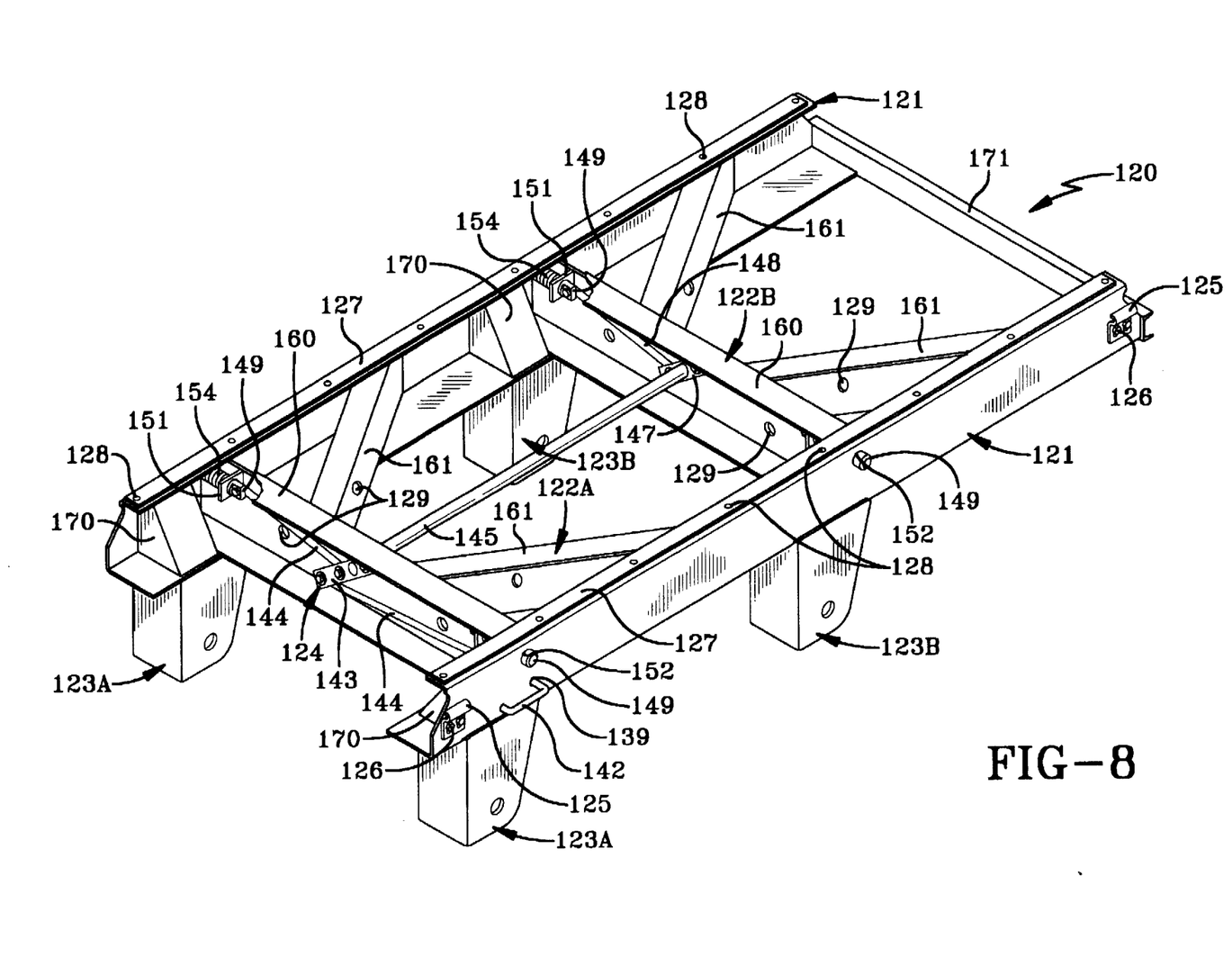
FIG. 8 is a fragmentary perspective view of the slider for tractor-trailers of the present invention showing the retractable pin mechanism used to selectively locate the slider along the underside of a trailer, and further showing depending hangers for suspending axle/suspension systems.

The improved slider for a tractor-trailer of the present invention is indicated generally at 120 and is shown in FIG. 8. Although slider 120 of the present invention is similar in many respects to prior art slider 20 described in detail hereinabove and shown in FIGS. 1–7, slider 120 is different than slider 20 in certain respects, thereby contributing to the improved performance of the slider of the present invention over prior art sliders. The structural and resulting performance differences between sliders 120 and 20 will be described in detail below. Slider 120 includes a pair of main members 121, front and rear generally K-shaped cross member structures 122A and 122B, respectively, front and rear pairs of hangers 123A and 123B, respectively, for suspending axle/suspension systems, and a retractable pin mechanism 124.

Specifically, each main member 121 is an elongated, generally C-shaped beam made of a metal such as steel or other suitable material. The open portion of each main member 121 is opposed to the open portion of the other main member and faces inboard relative to slider 120. Main members 121 are connected to each other in spaced apart parallel relationship by K-shaped cross member structures 122A, B.

In accordance with one of the main features of the present invention, each K-shaped cross member structure 122 includes a base member 160 which extends between and is perpendicular to main members 121. The open portion of each base member 160 faces in a frontward direction. Each end of base member 160 nests in the open portion of a respective one of main members 121, and is secured therein by any suitable means such as welding or mechanical fastening. Each base member 160 is a generally C-shaped beam made of a metal such as steel or other suitable material. Each front hanger 123A is attached by welding or other suitable means, to the lowermost surface of a respective one of main members 121 at a location directly beneath base member 160 of front K-shaped cross member structure 122A. Each rear hanger 123B is similarly attached at a location directly beneath base member 160 of rear K-shaped cross member structure 122B. Each K-shaped cross member structure 122 further includes a pair of inclined members 161, each of which is a generally C-shaped beam also made of a metal such as steel or other suitable material. The open portion of each inclined member 161 faces in an outboard-frontward direction, and each of the inclined members extends between generally the middle portion of base member 160 and a respective one of the main members 121. The front end of each inclined member 161 is attached to the rearwardmost surface of base member 160 at an angle by any suitable means such as welding or mechanical fastening, and the rear end of each of the inclined members is nested at an angle in the open portion of a respective one of main members 121, and also is attached thereto by any suitable manner such as welding or mechanical fastening. An optional reinforcement bar 171 which extends between the rearwardmost ends of main members 121, adds additional strength to the structure, and is attached thereto by any suitable means such as welding or mechanical fasteners. Thus, it can be seen that base member 160 and inclined members 161 form an integral K-shaped cross member structure 122 which interconnects and maintains main members 21 in a spaced apart parallel relationship. The advantages of K-shaped cross member structures 122 of the present invention over prior art cross members 22 will be described in detail hereinbelow.

One or more openings 129 (FIG. 8) are formed in the vertically extending surface of each base member 160 and each inclined member 161, and each of the openings 129 is aligned with the corresponding openings formed in the other members to provide for passage of air and/or fluid conduits, electrical lines, and the like used in the operation of the tractor-trailer (not shown).

Each main member 121 has a pair of rail guides 125 mounted on its outboard surface by bolts 126. Each rail guide 125 is mounted adjacent to a respective one of the ends of main member 121. A low friction strip 127 is attached to the uppermost surface of each main member 121 by recessed fasteners 128, and extends generally the entire length of main member 121. Strip 127 is formed of any suitable low friction material, such as ultra-high molecular weight polyethylene.

Figure 9:
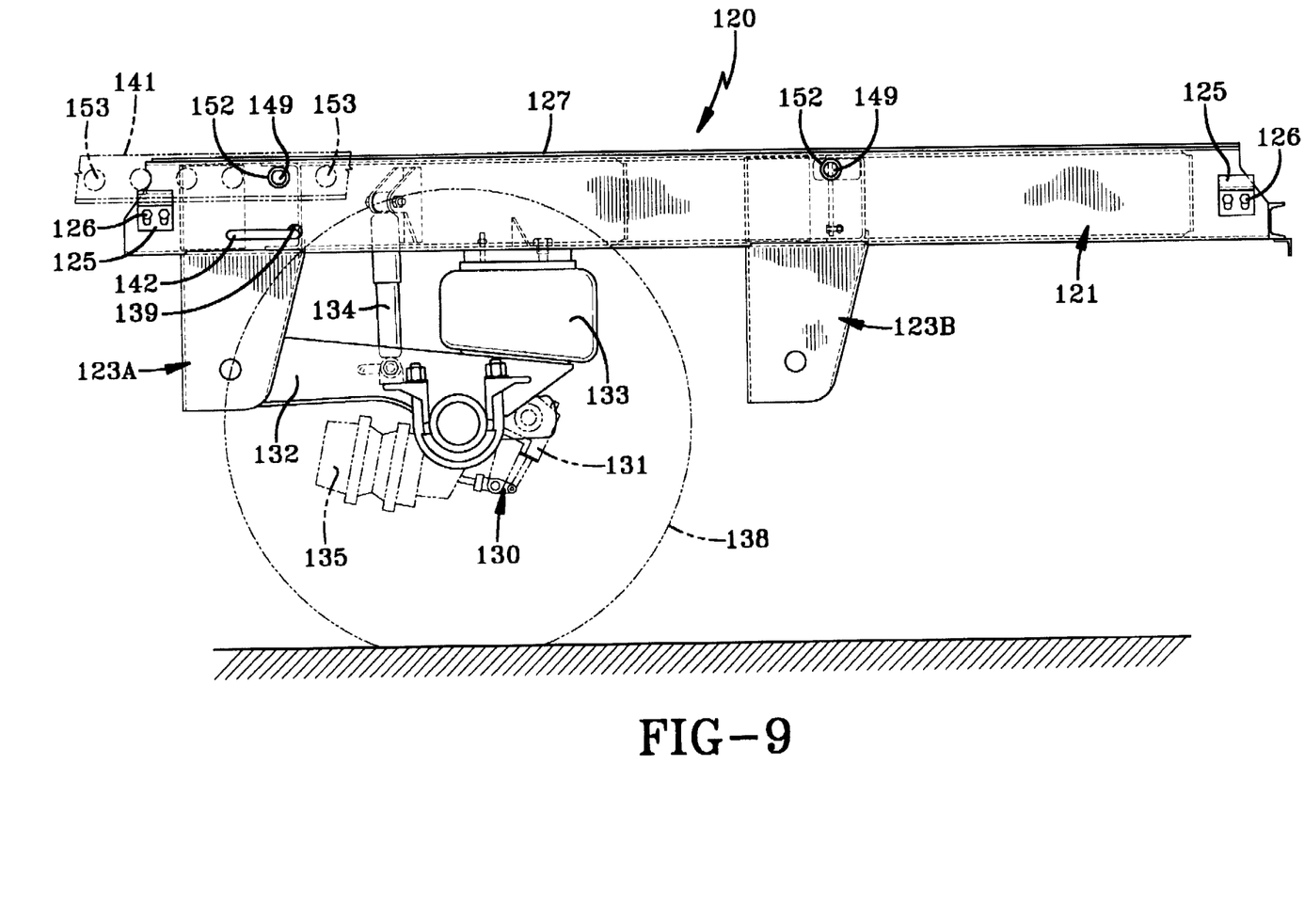
FIG. 9 is an enlarged fragmentary elevational view of the slider of the present invention shown in FIG. 8, but showing one of the axle/suspension systems, with the location of a wheel, portions of the suspension system, and a trailer rail on which the slider is movably mounted, shown in broken lines.
Figure 10:
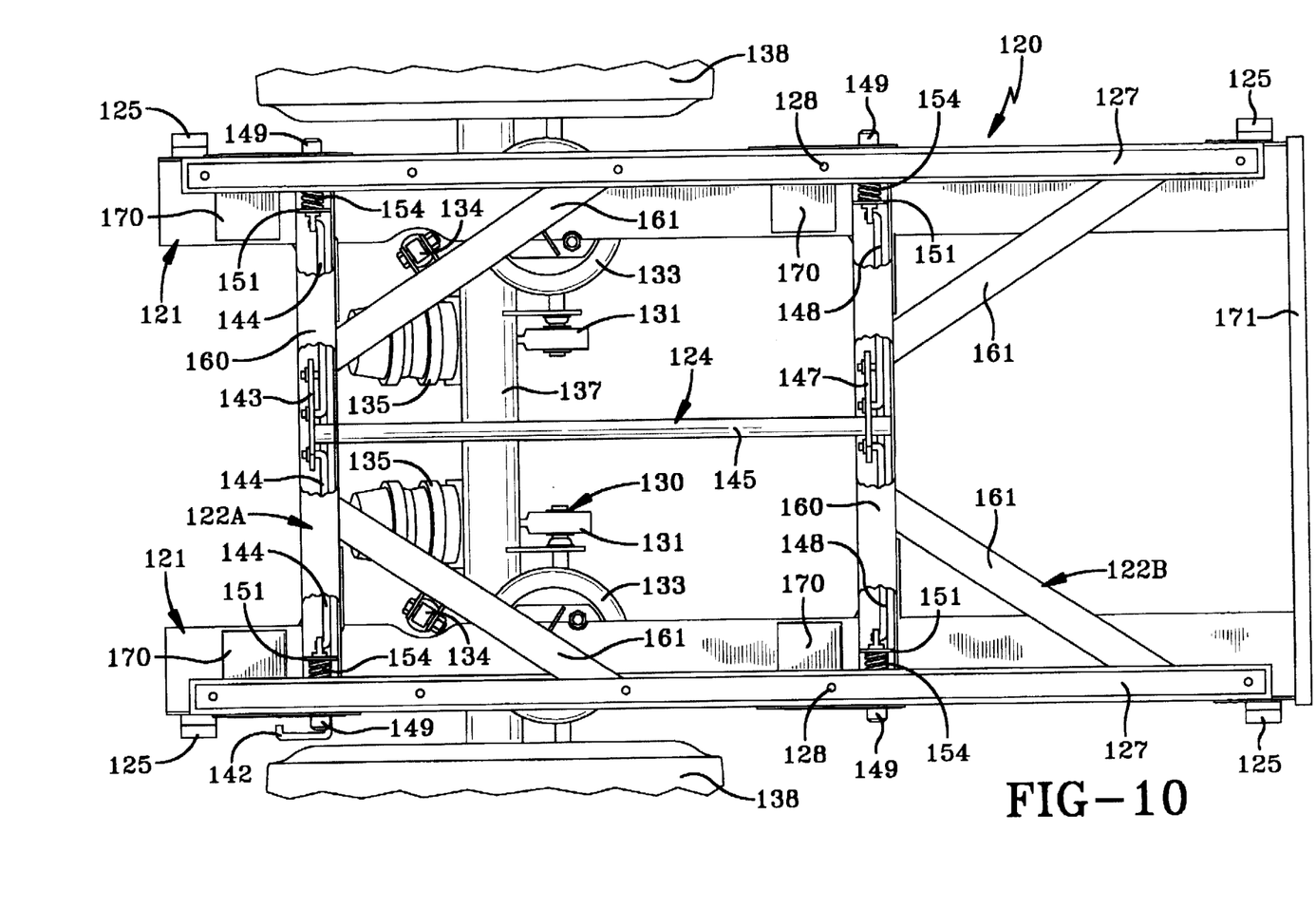
FIG. 10 is a fragmentary top plan view of the slider of the present invention shown in FIG. 9.

As mentioned hereinabove, and as best shown in FIGS. 9 and 10, slider 120 of the present invention supports front and rear axle/suspension systems. However, only front axle/suspension system 130 is shown in the drawings and described herein since the front and rear systems are identical in structure and operation. Moreover, inasmuch as axle/suspension system 130 is suspended from slider 120, but does not form an integral part thereof, only the major components of system 130 will be cited for aiding in the description of the environment in which the slider of the present invention operates. Axle/suspension system 130 includes generally identical suspension assemblies 131 suspended from each hanger 123A of the pair of front hangers. A reinforcement box 170 is mounted by any suitable means in the open portion of each main member 121, frontward of and adjacent to each end of each of base members 160, to provide additional strength to slider 120 for supporting hangers 123A, B and their associated suspension assemblies 131. Each suspension assembly 131 includes a suspension beam 132 which is pivotally mounted on hanger 123A in a usual manner. An air spring 133 is suitably mounted on and extends between the upper surface of the rearwardmost end of suspension beam 132 and main member 121 at a location directly beneath the outboard end of a respective one of inclined members 161 of K-shaped cross member structure 122A. A shock absorber 134 extends between and is mounted on suspension beam 132 and the respective inclined member 161. Another component of suspension assembly 131, mentioned herein only for the sake of relative completeness, is an air brake 135. An axle 137 extends between and is captured in the pair of suspension beams 132 of axle/suspension system 130. One or more wheels 138 are mounted on each end of axle 137.

Slider 120 is movably mounted on the trailer body (not shown) by slidable engagement of rail guides 125 with spaced apart, parallel and generally Z-shaped rails 141 (FIG. 9), which are mounted on and depend from the underside of the trailer body. Each low friction strip 127 abuts the bottom surface of the uppermost portion of a respective one of rails 141 to provide a smooth, generally friction-free contact surface for slidable movement of slider 120 on the trailer body.

Slider 120 can be selectively positioned relative to the trailer body for optimum load distribution by retractable pin mechanism 124. As best shown in FIGS. 8 and 10, pin mechanism 124 includes a generally L-shaped handle 142 which passes through an opening 139 formed in a selected one of main members 121. It can be seen that the bent end portion of handle 142 which extends outwardly from the outboard side of main member 121 is accessible for easy grasping by an operator of the tractor-trailer. The inboard end of handle 142 is pivotally attached to a lever 143, which in turn is pivotally attached to a pair of arms 144 which extend in opposite outboard directions from lever 143. Lever 143 further is attached to an elongated pivot rod 145 which passes rearwardly through an opening (not shown) formed in base member 160 of front K-shaped cross member structure 122A. The end of pivot rod 145 remote from lever 143 is similarly attached to a remote lever 147, which in turn is pivotally attached to a pair of arms 148 which extend in opposite outboard directions from lever 147. The outboard end of each of arms 144, 148 is bent and is pivotally attached to the inboard end of a pin 149.

The inboard end of each pin 149 is slidably mounted (FIGS. 8 and 10) in an opening (not shown) formed in a bracket 151 which is attached by suitable means such as welding to a respective one of base members 160. The enlarged outboard end of each pin 149 passes through an opening 152 formed in a respective one of main members 121. When it is desired to lock slider 120 in a selected position relative to the trailer body, the main member openings 152 are aligned with selected ones of a plurality of correspondingly-sized openings 153 formed in rails 141 of the trailer body (FIG. 9). Each pin 149 automatically extends through the selected aligned openings 152, 153 since the pin is biased in an outboard direction by a coil spring 154 captured between bracket 151 and the enlarged outboard end of pin 49. When it is again desired by the operator of the tractor-trailer to move slider 20 beneath the trailer body, the parking brake of the trailer is engaged, handle 142 is pulled in an outboard direction to retract pins 149 out of rail openings 153, and slider 120 is moved longitudinally along rails 141 until main member openings 152 align with selected rail openings 153 and pins 149 engage therewith as described hereinabove for maximizing load distribution.

Figure 11:
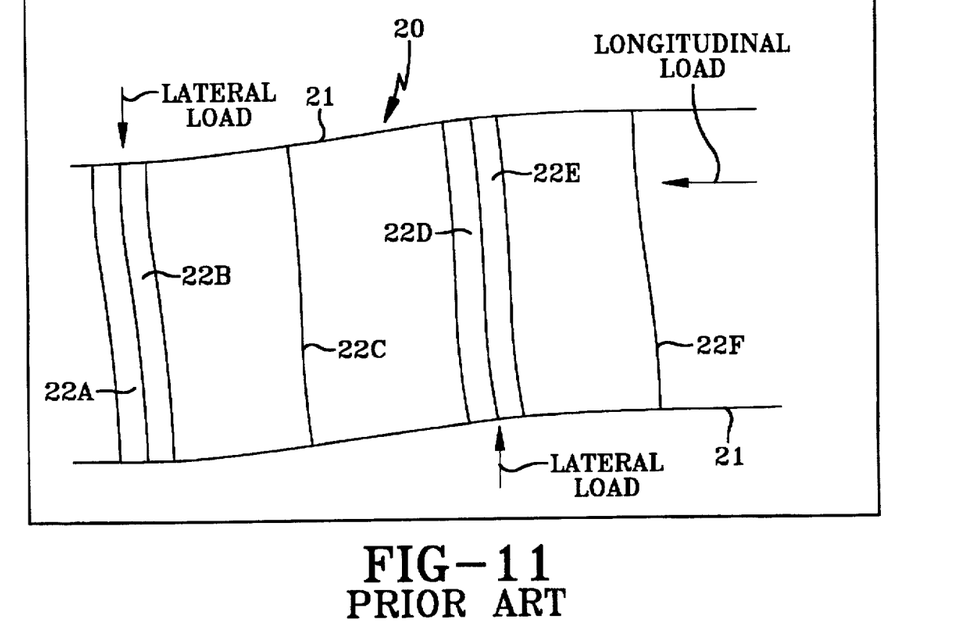
FIG. 11 is a diagrammatic top plan view of the prior art slider of FIGS. 1–7, showing the resulting S-shaped bending inflicted on the slider by lateral and longitudinal loads.

As discussed above, one of the most important features of the present invention is K-shaped cross member structure 122, which includes base member 160 and inclined members 161 and which replaces and improves upon conventional cross members 22 of prior art slider designs. More particularly, slider 120 of the present invention optimizes cross member structure location for withstanding combined vertical, lateral and longitudinal loading conditions experienced by the slider primarily during movement of the tractor-trailer, yet reduces the overall weight of the slider from that of prior art sliders by up to about fifteen percent. Specifically, sliders should be constructed so that they can withstand the various load conditions that a trailer will be subjected to during movement of the tractor-trailer. Vehicles containing more than one non-steerable axle, such as tractor-trailers, are subject to lateral or side loads. As shown in FIG. 11, which is a schematic representation of prior art slider 20, it can be seen that lateral loads, represented by arrows, are directed through the slider hangers (not shown in this FIG.) in opposite directions. Also, longitudinal loads, represented by an arrow in FIG. 11, can adversely affect slider 20. The S-shaped bending or racking effect of such lateral and/or longitudinal loads on slider 20, as represented in FIG. 11, can be significant. However, in addition to the lateral and longitudinal loads, sliders must be capable of withstanding extreme vertical loads (not shown) inputted through the suspension assemblies and hangers (not shown in FIG. 11). Again, cross members 22C and 22F are located directly above the site of the air spring attachments on main members 21 to provide support, and as discussed immediately above, cross members 22A, B, D and E provide support to the hangers. Prior art slider 20 and similar designs attempt to control the adverse effect produced by vertical loads by using rigid, and therefore heavy, main members 21 and cross members. Although the heavy and rigid conventional cross member configuration optimizes the capability of prior art sliders to withstand vertical loads, the ability of such prior art slider designs to withstand lateral and longitudinal loads is less than optimum since the resulting racking effect on the rigid and heavy slider causes high stress at the joints of cross members 22 and main members 21, and ultimately reduces the life of the slider.

Figure 12:
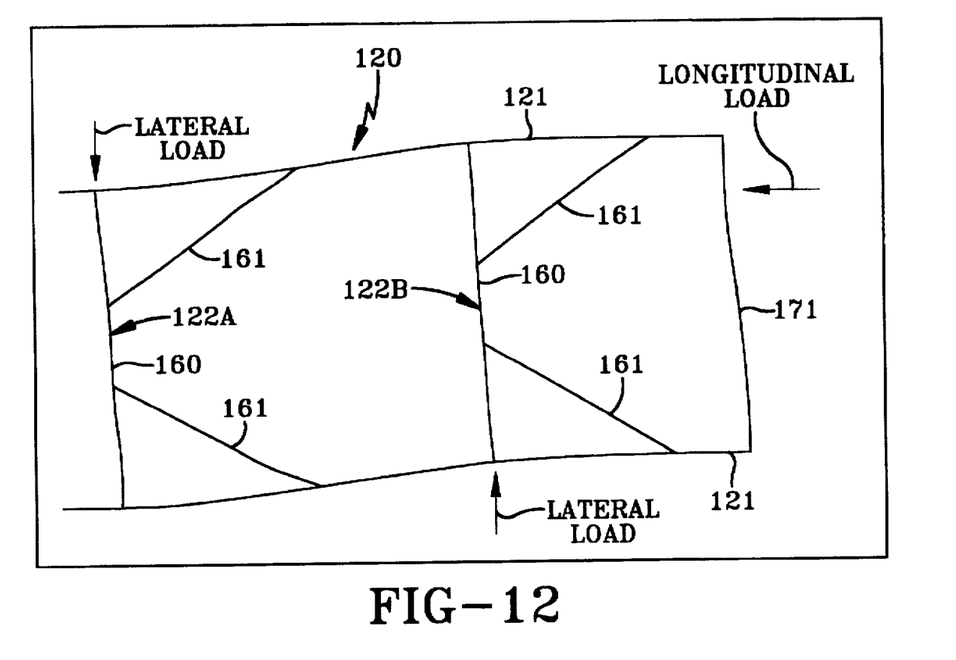
FIG. 12 is a diagrammatic top plan view of the slider of the present invention of FIGS. 8–10, showing the resulting S-shaped bending inflicted on the slider by lateral and longitudinal loads.

On the other hand, the present invention optimizes the ability of slider 120 to withstand lateral, longitudinal and vertical load conditions by utilizing the K-shaped cross member structures 122 (FIG. 12), and furthermore provides for significant weight and manufacturing cost savings from prior art slider designs due to a reduction in parts and associated labor required to assemble those parts. The cross members 22A–C and 22D–F of prior art slider 20 are replaced by K-shaped cross member structures 122A and 122B, respectively, to achieve such optimization. More particularly, and referring now only to front K-shaped cross member structure 122A since the structure and effect of rear structure 122B is virtually identical, a single base member 160 replaces two cross members 22A, B in supporting the front hangers against vertical loads. Inclined members 161, in combination with base member 160, provide lateral and longitudinal support to slider 120 by forming the K-shaped structure or brace 122A. Inclined members 161 also are positioned to provide vertical support for the air springs. The result is optimum capability of slider 120 to withstand the combined vertical, lateral and longitudinal loading conditions, while reducing the overall weight of the slider. It should be noted that while the attachment point of the front end of each inclined member 161 on base member 160 can be varied, the front ends should generally be spaced to prevent placing excess loads on the base member. Also, the front ends should generally be spaced from main members 121 as well, to avoid placing excess loads on the hangers. Of course, strengthening the base member and hangers would permit such extreme inboard and outboard positioning of the front end of each inclined member 161, but this would add undesirable weight to the slider.

Thus, slider 120 possesses improved ability to withstand lateral and longitudinal loads such as may be produced when the tractor-trailer performs split mu surface braking and drag turns, or encounters cornering impact with curbs and direct impact with potholes.

Finally, it is understood that the present invention contemplates a slider having a single axle/suspension system and thus a single K-shaped cross member structure. The present invention further contemplates placing K-shaped structures 122A and B, and their respective axle/suspension systems, in opposed relationship to one another.

Accordingly, the improved slider for tractor-trailers is simplified, provides an effective, safe, inexpensive, and efficient system which achieves all the enumerated objectives, provides for eliminating difficulties encountered with prior tractor-trailer sliders, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved trailer slider is constructed, arranged and used, the characteristics of the construction and arrangement, and the advantageous, new and useful results obtained; the new and useful structures, devices, elements, arrangements, parts and combinations are set forth in the appended claims.

We claim:

1. A subframe structure for a vehicle trailer, said subframe structure being movably mountable on spaced-apart, parallel elongated rails mounted on the bottom of said trailer, said subframe structure including:
   a) a pair of spaced-apart, parallel elongated main members, said main members each including means for movably engaging a respective one of said trailer rails;
   b) at least one cross member structure which extends between and is attached to said main members, said cross member structure including:
      (i) a base member having a pair of ends, said base member extending perpendicularly between and being attached to said main members at said base member ends;
      (ii) a pair of inclined members each having a base end and an outboard end, said inclined members each extending angularly between and being attached to a respective one of said main members at the outboard end and said base member at the base end, said base ends of said inclined members being attached to said base member in a spaced-apart relationship;
   c) reinforcement means attached to each of said main members adjacent to and spaced from said ends of said base member;
   d) a hanger attached to and depending from each of said main members adjacent to the base member ends supporting an axle/suspension system;
   e) an air spring of said axle/suspension system mounted on and depending from each of said main members adjacent to the outboard end of a respective one of said inclined members;
   f) a pair of shock absorbers of said axle/suspension system, in which an upper end of each of said shock absorbers is attached to a respective one of said inclined members; and
   g) means for selectively positioning said subframe structure relative to said trailer for variable load distribution of cargo contained in the trailer.

2. The subframe structure of claim 1, in which said means for movably engaging said trailer rails is a pair of rail guides mounted on each of said main members which can slidably engage said trailer rails; and in which a low-friction material is mounted on generally the entire uppermost surface of each of said main members to facilitate slidable movement of said subframe structure on said trailer.

3. The subframe structure of claim 2, in which the means for selectively positioning said subframe structure relative to said trailer is a retractable pin mechanism.

4. The subframe structure of claim 1, in which said subframe structure is formed of steel.

5. A subframe structure for a vehicle trailer, said subframe structure being movably mountable spaced-apart, parallel elongated rails mounted on the bottom of said trailer, said subframe structure including:
   a) a pair of spaced-apart, parallel elongated main members, said main members each including means for movably engaging a respective one of said trailer rails;
   b) at least one cross member structure which extends between and is attached to said main members, said cross member structure including:
      (i) a base member having a pair of ends, said base member extending perpendicularly between and being attached to said main members at said base member ends;
      (ii) a pair of inclined members each having a base end and an outboard end, said inclined members each extending angularly between and being attached to a respective one of said main members at the outboard end and said base member at the base end, said base ends of said inclined members being attached to said base member in a spaced-apart relationship;
   c) reinforcement means attached to each of said main members adjacent to the base member ends;
   d) a hanger attached to and depending from each of said main members adjacent to the base member ends supporting an axle/suspension system;
   e) an air spring of said axle/suspension system mounted on and depending from each of said main members adjacent to the outboard end of a respective one of said inclined members;
   f) a pair of shock absorbers of said axle/suspension system, in which an upper end of each of said shock absorbers is attached to a respective one of said inclined members; and
   g) means for selectively positioning said subframe structure relative to said trailer for variable load distribution of cargo contained in the trailer.

* * * * *